United States Patent

[11] 3,633,188

[72] Inventor Eric E. Bittmann
Downingtown, Pa.
[21] Appl. No. 846,650
[22] Filed July 22, 1969
[45] Patented Jan. 4, 1972
[73] Assignee Burroughs Corporation
Detroit, Mich.
Continuation of application Ser. No. 268,987, Mar. 29, 1963, now abandoned. This application July 22, 1969, Ser. No. 846,650

[54] ELECTROMAGNETIC TRANSDUCER EMPLOYING A THIN MAGNETIC FILM HAVING AN ORIENTED EASY DIRECTION OF MAGNETIZATION
19 Claims, 10 Drawing Figs.

[52] U.S. Cl. .......... 340/174.1 F, 179/100.2 CF, 340/174 TF
[51] Int. Cl. .......... G11c 11/14, G11b 3/30
[50] Field of Search .......... 340/174.1 MO, 174.1 F, 174 TF; 179/100.2 C, 100.2 CF; 346/74 MC

[56] References Cited

UNITED STATES PATENTS 3,179,928 4/1965 Sorensen .......... 340/174 TF
3,125,745 3/1964 Oakland .......... 340/174 TF
3,188,613 6/1965 Fedde .......... 340/174 TF
3,195,108 7/1965 Franck .......... 340/174 TF
3,252,152 6/1966 Davis et al. .......... 340/174 TF
3,103,665 10/1963 Martin et al. .......... 340/174.1
3,251,054 5/1966 Simon .......... 340/174.1
3,271,751 9/1966 Probester .......... 340/174.1
3,317,742 5/1967 Guerth .......... 340/174.1
3,521,258 7/1970 Hurr, Jr. .......... 340/174.1

*Primary Examiner*—Bernard Konick
*Assistant Examiner*—Vincent P. Canney
*Attorney*—Carl Fissell, Jr.

ABSTRACT: This disclosure relates to a transducer apparatus for the nondestructive readout of tapes and other magnetic records which apparatus includes a magnetizable thin film mounted on a planar substrate and which is anisotropic in nature having a preferred or easy direction of magnetization. The film is provided with a conductor parallel to the easy axis of magnetization and also conductor normal to the easy axis of magnetization with the conductors oriented relative to the film such that current pulses sent through the first conductor will not induce an appreciable signal in the other conductor without the presence of an external magnetic field while such current pulses sent through the first conductor will induce either a positive or negative sense signal in the presence of an external magnetic field.

INVENTOR.
ERIC E. BITTMANN
BY
Carl Fissell Jr
AGENT

INVENTOR.
ERIC E. BITTMANN
BY
Carl Fissell Jr.
AGENT

ELECTROMAGNETIC TRANSDUCER EMPLOYING A THIN MAGNETIC FILM HAVING AN ORIENTED EASY DIRECTION OF MAGNETIZATION

The present application is a continuation of my copending application Ser. No. 268,987 filed Mar. 29, 1963 which application is now abandoned.

The present invention relates to electromagnetic transducer apparatus, and more particularly, although not necessarily exclusively, to electromagnetic transducers of the type employing thin magnetic films. More particularly, the present invention is directed to a transducer in which a magnetically oriented thin film disposed relative to a dielectric member is provided with sense and drive conductors in a manner effective to enable the transducer to read from a magnetizale material, e.g., tape, wire, sheet or other similar material.

It is an important object of the present invention to provide a new and improved electromagnetic transducer apparatus.

Another object of the present invention is to provide transducer apparatus of exceptionally small relative size which requires no relative movement between the record member and the transducer during the reading operation.

A still further object of the present invention is to provide an electromagnetic transducer apparatus employing a magnetizable thin film as the active element for reading from a record member.

In accordance with the foregoing objects and first briefly described, the invention comprises transducer apparatus wherein a magnetizable thin film supported upon a planar substrate is provided with a conductor parallel to the preferred or easy direction of magnetic orientation of the film and a conductor normal to the preferred direction of magnetization, with the conductors oriented relative to the film such that current pulses sent through the first conductor induce no signal while an external magnetic field produces either a positive or a negative sense signal when either the north or south pole of the external field is adjacent the film.

These and other novel features of the invention together with further objects and advantages thereof, will become more apparent from the following detailed specification and claims with reference to the accompanying drawings in which:

Figure 5:
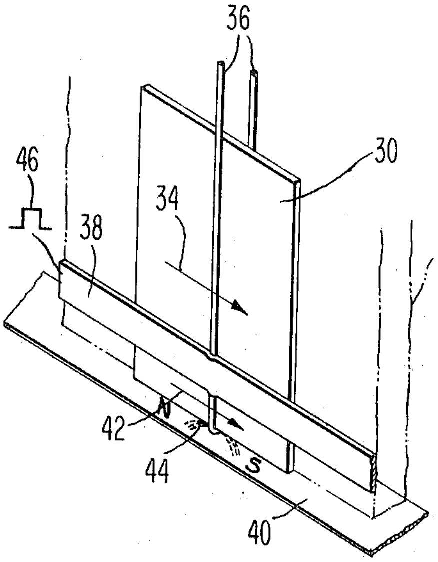
FIG. 5 and 6 are isometric views on a greatly enlarged scale of one embodiment of the present invention.
Figure 6:
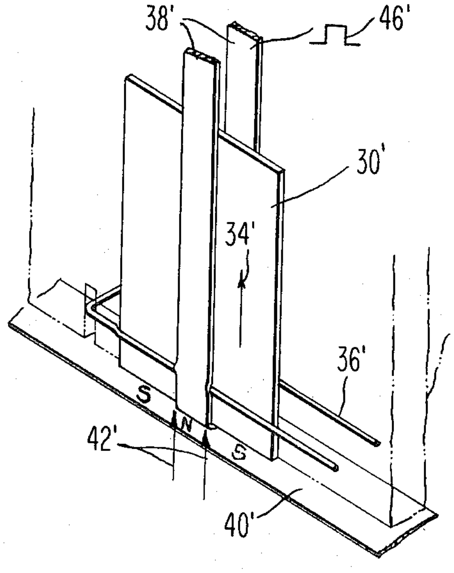
Figure 7:
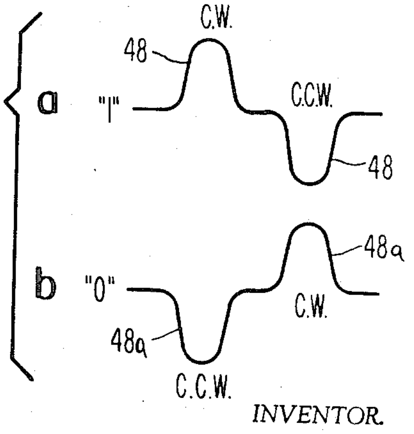
Figure 9:
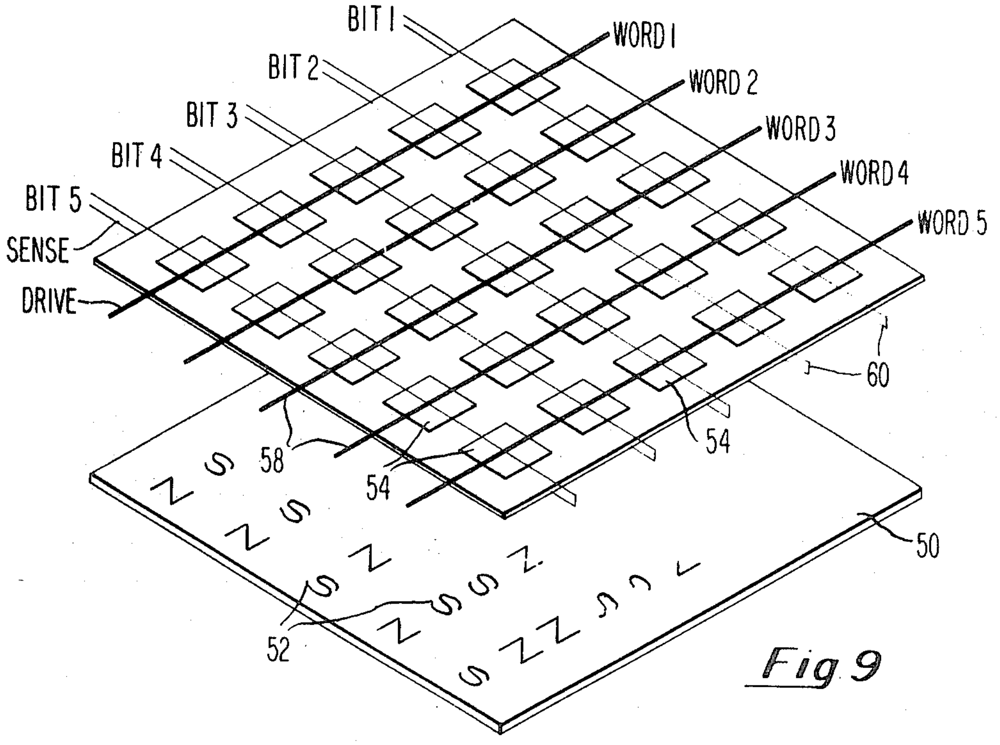
Figures 8, 10:
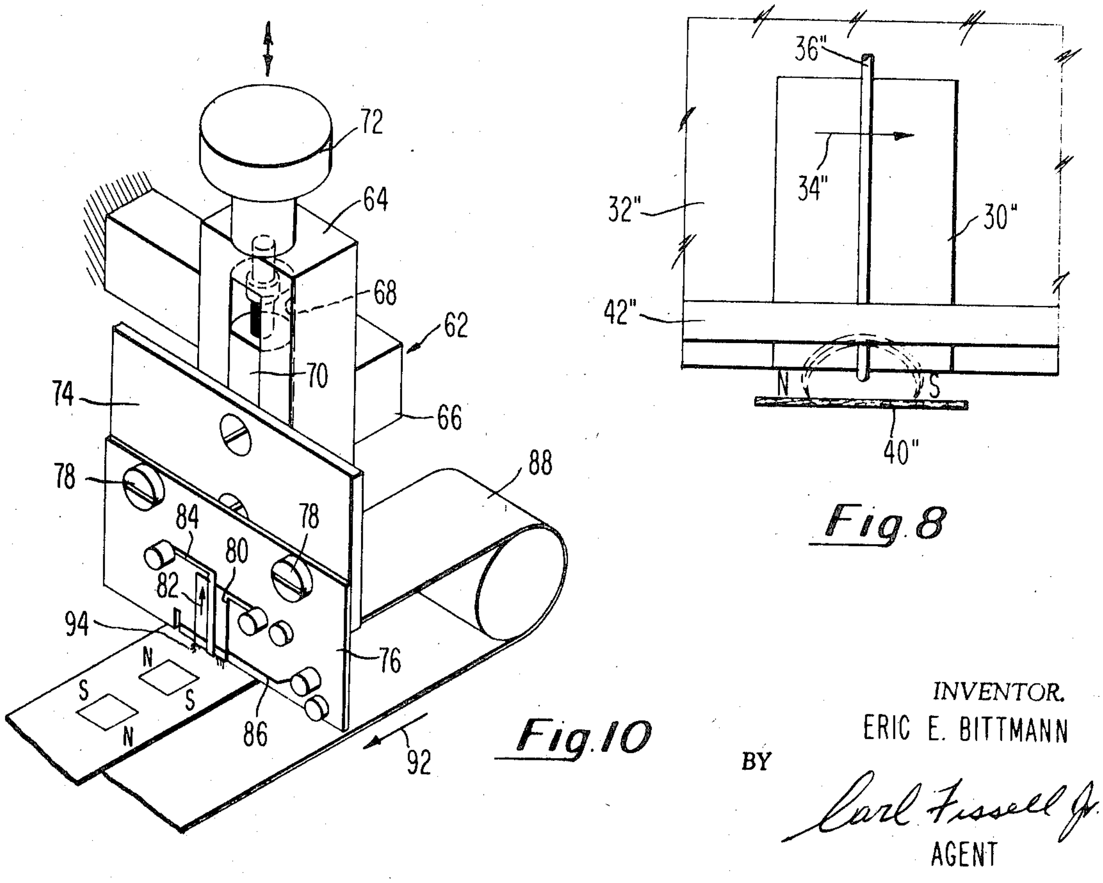

**FIGS. 7*a* and 7*b* are curves of the sense output for the apparatus of FIGS. 5 and 6** in the ZERO or ONE state;

FIG. 8 is a diagrammatic illustration of the transducer of FIG. 5;

FIG. 9 is an isometric view of a static transducer incorporating the present inventive concept; and

FIG. 10 is an isometric view of a preferred embodiment of the present invention.

Figure 1:
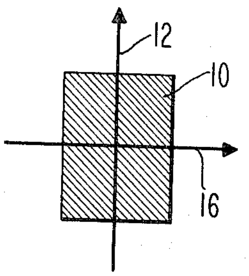
FIG. 1 represents a diagrammatic graph of the axis of orientation of the thin film.
Figure 3:
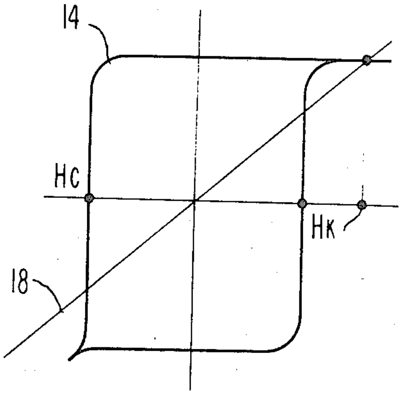
FIG. 3 is a diagrammatic illustration of the square and linear hysteresis loop characteristics of the thin film of the present invention.

A magnetizable thin film 10 which is deposited on a substrate (e.g., glass microscope slide polished metal—AL or Ag) while under the influence of an external magnetic field shows a preferred or "easy" direction 12 of magnetization All area magnetic domains of the film lie parallel to the direction of this field, and the magnetic characteristic of the film in the preferred direction shows a square hysteresis loop 14, as seen more particularly in the diagram of FIG. 3. Perpendicular to this easy direction, called the "hard" direction 16, FIG. 1, the film shows a linear loop 18, FIG. 3. From these characteristics, two constants, the wall coercive force measured in the easy direction $H_c$, and the rotational coercive force, measured in the hard direction $H_k$, can be derived. Thus the behavior of a thin film can be compared with that of a magnetic dipole having two magnetic states both of which are parallel to the preferred or "easy" direction. These two states can be made to represent the storage of ONE or a ZERO in the thin film element.

The "easy" axis is the anisotropy axis which is determined during the deposition process, i.e., by the magnetic field which is present during the deposition of the material forming the film. This "easy" axis determines where the magnetic moments of the film will be at rest. This "easy" direction is defined as longitudinal, or for purposes of the present description vertically, upwardly toward the top of the drawing, while the "hard" direction is defined as transverse or at right angles to the easy direction. The "easy" direction is further considered to be the direction with the dipoles at rest.

Figure 2:
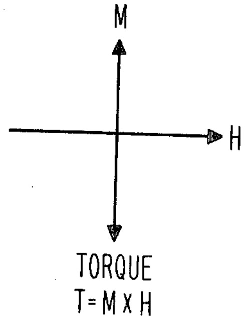
FIG. 2 is a vector diagram illustrating the direction of magnetization of the thin film effective to produce an effective torque.

Since, as earlier set forth, the magnetic film acts as a magnetic dipole, the spins of electrons have a magnetic moment M, so that if a field is applied to the film a torque is created, FIG. 2. The torque creates a rotation of the dipoles and the electron spin axes rotate until the torque is reduced to ZERO. The torque expression enables the derivation of the switching equation for the film. The solution of the switching equation when plotted produces the asteroid diagram of FIG. 4.

Stoner and Wohlfarth have expressed the free energy of a magnetic film as follows:

$$E=K\cdot\sin^2\theta-H_LM\cos\theta-H_TM\sin\theta$$

in a normalized expression divided by 2K and set for $$H_k=\frac{2K}{M}=\text{constant}$$

$$\frac{E}{2K}=\frac{1}{2}\sin^2\theta-H_L/H_K\cos\theta-H_T/H_K\sin\theta$$

and set $$h_L=H_L/H_K \text{ and } h_T=H_T/H_K,$$

and $$E'=\frac{E}{2K}$$

this expresses the films energy as $$E'=\tfrac{1}{2}\sin^2\theta-h_L\cos\theta-h_T\sin\theta$$

The torque is equal to the differential of this expression:

$$T=dE'/d\theta=\sin\theta\cos\theta+h_L\sin\theta-h_T\cos\theta$$

Any applied field with the two components $h_L$ and $h_T$ creates a torque and the angle $\theta$ changes to reduce the torque to ZERO. To obtain the extremes (maxima and minima) of the above torque expression of the second derivative of the energy is used and set to ZERO $$d^2E'/dt^2=\cos^2\theta-\sin^2\theta+h_L\cos\theta+h_T\sin\theta=0$$

This is solved by multiplying the first derivative expression by $\sin\theta$ and the second by $\cos\theta$. The addition of the two yields:

$$\cos^3\theta+h_L=0$$

and $$h_L=-\cos^3\theta$$

In similar manner solving for $h_T=\sin^3\theta$. These are the parameters of an asteroid (Stoner-Wohlfarth) curve. One finds the angular position of M when a field is applied by drawing the tangent line to this curve from the applied field.

The tangent of a curve given in parameters $X=X(t)$ and $Y=Y(t)$ is expressed in $$\frac{\dot{Y}}{\dot{X}}=\frac{Y_1-Y}{X_1-X}$$

$$Y=\sin^3\theta$$
$$\dot{Y}=3\sin^2\theta\cos\theta$$
$$X=-\cos^3\theta$$
$$\dot{X}=3\cos^2\theta\sin\theta$$
$$X_1=h_L$$
$$Y_1=h_T$$

inserted values $$\frac{h_T-\sin^3\theta}{h_L+\cos^3\theta}=\frac{\sin\theta}{\cos\theta}$$

$$\sin\theta\cos\theta+h_L\sin\theta-h_T\cos\theta=0$$

Figure 4:
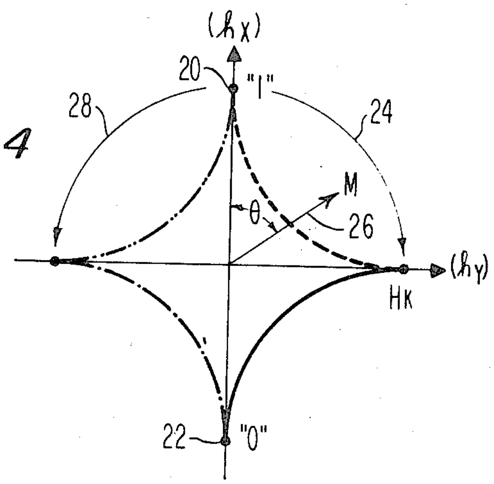
FIG. 4 is a graph illustrating the rotative coercive forces of the block wall domains of the structure.

As seen in FIG. 4, the top of the vertical line indicated by reference character 20 can be considered the ONE state while the bottom of the vertical line 22 can be considered the ZERO state. The "easy" axis direction determines the magnetic remanence of the film, i.e., where the film wants to remain. The application of a slight transverse field causes a vector M to rotate a slight distance (rightwardly) in the direction of arrow 24 toward the hard direction. Thus, as before stated, in order to determine how far the vector M has rotated, it is simply necessary to draw a tangent 26 right (or left) of the vertical on the asteroid diagram, FIG. 4, originating from the point of the applied field. For purposes of the present description the X axis ($h_x$) is vertical while the *y* axis ($h_y$) is horizontal.

If the vector M is the ONE state, as shown, it will rotate clockwise (arrow 24) through the angle $\theta$, the distance shown, to a position ahead of or slightly above the point $H_k$. If the vector is on the other side, i.e., to the left, of the vertical axis, it will rotate counterclockwise, arrow 28. However, when the point $H_k$ is reached, the tangent on the curve 26 is 90°. At this point all M vectors are 90°. Removal of the applied field, leaves the film demagnetized in a random manner. The anisotropy returns half the M vectors to the ONE state and the other half to the ZERO state. It follows that applying a pulse along the horizontal axis produces no signal output, when the film is in the demagnetized state. However, a relatively slight DC bias from a stray magnetic field in one of the other directions is sufficient to cause the film to move to the ONE or the ZERO state with removal of the field, depending upon the stray field polarity. A readout signal is obtained when the field interrogates the state again. It is apparent then that the film is extremely sensitive to very slight stray magnetic fields. For this reason the film can be made to act as a highly sensitive transducing mechanism making the device extremely useful and efficient in reading from or writing upon a magnetizable material such as a record member on which there has been deposited magnetic particles. The sensitivity of the pickup is more or less dependent upon the film's demagnetizing force. A thin film electromagnetic transducer in accordance with the teaching of the present invention is shown schematically in FIG. 5 and is seen to include a magnetic thin film 30 which is supported upon a substrate 32, of glass or other smooth material. The magnetic domain orientation of the film 30 has its "easy" axis in the direction of the arrow 34. A sense conductor 36 in the form of a loop surrounds the film 30. A transverse (word) drive winding or conductor 38 is secured to the film at right angles to the sense conductor 36. The film is disposed adjacent a magnetizable record member 40, e.g., tape, sheet, etc., in order to act as a pickup or writing device.

Assuming that the magnetic field or signal it is desired to sense or pickup has the predominant component, arrow 42, as a result of the magnetic lines of force 44 then the arrangement of FIG. 5 is the most efficient structural configuration.

The structural arrangement of FIG. 6 is basically similar to that of FIG. 5, but in FIG. 6, film 30' has the easy axis magnetically oriented in the direction of the arrow 34' with the other elements of the combination being similar but arranged as shown. Assuming that the magnetic field has a predominant component 42' then this arrangement would be most effective. The sensitivity to the stray field is a function of the length of the film 30. In both cases, the transverse word drive component is larger than $H_k$, FIG. 4.

As shown in FIG. 7*a* if the film is in the ONE state and it is read out, there is a clockwise rotation of the vector FIG. 4. When a drive pulse 46, FIGS. 5 and 6 is applied, the pickup loop 36 or 36' senses a flux change which is increasing towards the loop as indicated by the vertical rise of the output pulse 48 above the horizontal axis. The vector rotation gives the sense signal. When the pulse 46 cuts off pulse 48 falls back, in counterclockwise direction. FIG. 7*b* illustrates the opposite polarity condition starting from the ZERO state. Here the flux is increasing away from the loop producing a counterclockwise rotation of the vector with the pulse 48*a* below the horizontal axis. The polarity of the drive current determines on which side of the vertical axis of the asteroid diagram, FIG. 4, the device is operating.

FIG. 8 is a side elevational view of the present invention and shows the drive conductor 42'' oriented in the easy direction with the easy axis of the film 30'' in the direction of arrow 34''. The sense loop 36'' is arranged orthogonally as shown. With the magnetic material 40'' adjacent the loop 36'', a field $H_t$ is developed (transverse) which is greater than $H_k$, and thus biases the lower portion of the film 30''. Without it this portion of the film is nulled producing ZERO output. With the field N–S present from the magnetic record 40'', e.g., tape, a signal is picked up in the transducer.

FIG. 9 illustrates the utilization of the teaching of the present invention as embodied in a static transducer. A sheet of magnetic or magnetizable material 50, e.g., cobalt or iron oxide, is magnetized with a desired pattern, e.g., rows and columns of magnetic spots 52 (N–S) as shown. The reading-recording devices are thin films 54 deposited on a smooth planar support 56 oriented, for the sake of the present example, in rows and columns forming a 5×5 matrix. Work drive lines or loops 58 are arranged orthogonally relative to sense loops 60. The conductor lines 58 and 60 can be characterized as "work drive lines" and "bit sense lines," 1–5, respectively. This arrangement can be employed to represent ONES and ZEROS in a so-called storage matrix or a so-called "fixed store."

By moving the member 50 in a direction toward the member 56 e.g., stop-start incremental step motion reading from the member 50 can be accomplished as desired. Member 50 can be any type of magnetizable material such as an index card which has been provided with a desired pattern of information in the form of magnetized spots or bits. Such a fixed store is extremely reliable and operates substantially without any transcribing error.

In FIG. 10 there is seen a different type of transducer 62 from that of FIG. 9. A mounting bracket 64 is disposed on a fixed horizontal arm 66. Bracket 64 is provided with a hollow bore 68 into which an elongated pin 70 is threadedly received for rectilinear movement therein in response to rotation of a knurled knob, 72, secured to the upper end thereof. The lower end of member 64 carries a plate 74 to which a dielectric member 76 is secured by bolts 78. A magnetizable thin film element 80 is mounted on the dielectric 76 with its easy axis oriented vertically in the direction of arrow 82. A drive loop 84 is orthogonally arranged relative to a sense pickup loop 86. The film 80 is adjustably oriented relative to a magnetized tape 88 carrying stored bits 90. The tape is made to move in the direction of the arrow 92 by means not shown. The magnetic field 94 as a result of the magnetic bits is as shown and will induce a signal which can be sensed by the sense pickup loop 86. The amplitude of the sensing output is dependent upon the strength of the exterior field and thus the proximity of the transducer to such field. It is of course apparent that the transducer may be suitably shielded to reduce or eliminate undesirable field effects. Typical parameters for a device constructed in accordance with the present invention as shown in FIG. 10 were as follows:

| | |
|---|---|
| drive conductor **84** | 0.030 wide by 0.002''thick |
| sense conductors **86** | 0.010 wide by 0.001''thick |
| drive currents | 1 a. |
| observed signals | approximately 10 m. |
| readout frequency | 1 megacycle |
| film thickness | 250 to 3,000 A. |
| substrate | glass microscope slide |
| input pulse repetition rate | 1 megacycle (any appropriate frequency may be used) |
| pulse width | 250 nanoseconds |

Films driven repeatedly by a transverse field in the hard direction do not induce a signal in a sensing conductor because the film remains demagnetized. However, stray fields of a 10th oersted magnitude influence the return of the dipoles from the hard to the easy direction when the stray field direction runs longitudinal thereto. With the stray field present the return of the dipoles from the hard to the easy direction is not random, but predominantly to one state. An additional readout from a magnetic bit, e.g., tape or card induces a sense signal whose amplitude and polarity are an indication of the stray field's strength and polarity. The sensitivity of such a readout is dependent upon the film's demagnetizing force. The magnetic field can originate from another film although the stray fields under discussion are seen originating from a magnetic tape or card. The film transducer detects the state of the tape or card independently of the velocity of the record member. Thus, the record may remain stationary.

The number of pulses per linear inch the film transducer can detect, depends upon the size and physical arrangement. In memory planes the film packing density lies between 50 and 100 to the inch and it is assumed that the same resolution is obtainable with a tape head. An important feature of this transducer is the static "read" capability. Also the single drive conductor and single sense conductor make it a low-cost device. To increase the transducer's sensitivity, multiple films can be used so as to reduce the film's demagnetizing effect. The conductors are then extended or run between the films. With suitable modification the present apparatus can be made to operate as a recording i.e. writing device. Since the transducer has no applicable effect on the external field as such it is apparent that it is operable as a nondestructuve readout apparatus.

I claim:

1. An electromagnetic transducer for sensing a movable magnetized storage member and comprising:

a. a rigid smooth supporting member.

b. a thin magnetizable film having an easy axis of magnetization and being disposed on said supporting member, the plane of the film being substantially normal to that of the magnetized member, said easy axis of magnetization being oriented to be parallel to the direction of magnetization of said magnetized member, c. electrical means parallel to said easy axis for inductivity applying an energizing field to said film thereby to orient the magnetic structure of said film in a desired direction, and d. a sense winding normal to said electrical means operably associated with said film effective to detect any changes in the orientation of the internal magnetic structure of the film when said film is brought near an external magnetic field, for providing an output signal indicative of said change.

2. An electromagnetic transducer for sensing movable magnetized storage members and comprising:

a. a rigid smooth substrate, b. a magnetizable thin film having an easy direction of magnetization and overlying said substrate and bonded thereto, said easy direction of magnetization being oriented parallel to the direction of magnetization of said magnetized members, the plane of the film being substantially normal to that of the magnetized members, c. electrically conductive means parallel to said easy axis for applying an electrical field to said thin film thereby to orient the crystalline lattice structure thereof in the hard direction, d. electrical conductive means orthogonally disposed relative to said last-named means for detecting the change in said structure from said hard direction to said easy direction when said film is adjacent an external magnetic field, and e. means adjustably supporting said transducer adjacent a magnetizable record member to enable sensing of the magnetic field in the latter.

3. An electromagnetic transducer for sensing a movable magnetized record member and comprising:

a. a rigid smooth support, b. a plurality of magnetizable thin films disposed on said support in rows and columns forming a matrix, said films having an easy direction of magnetization oriented parallel to the direction of magnetization of said magnetized members, c. drive conductors for each of said films arranged parallel to said easy direction of magnetization.

d. sense conductors for each of said films, e. each of said sense conductors encircling a row of films and disposed at right angles to said drive conductors for operable association with said magnetizable record member having one or more bits of information stored therein as magnetizable spots capable of being sensed by said transducer when said magnetizable member is brought into close proximity thereto.

4. An electromagnetic transducer comprising:

a. a glass substrate supporting member, b. a thin magnetic film of from 250 to 3,000 angstroms in thickness disposed on a surface of said substrate, c. a first electrical conductor secured to said substrate overlying said thin film and in surface contact therewith, d. a second electrical conductor secured to said substrate at right angles to said first conductor and electrically insulated therefrom, and e. means adjustably positioning said substrate carrying said film adjacent the magnetizable surface of a magnetizable record member for detecting the magnetic field or fields in the latter.

5. An electromagnetic transducer comprising:

a. a rigid smooth supporting structure, b. a magnetizable film disposed on said supporting structure, c. said film having uniaxial anisotropy resulting in a single easy axis of magnetization in the plane of the film and being capable of assuming either of two stable states of magnetic remanence along said axis, d. energizing means operably associated with said film and parallel to said easy axis for generating a magnetic field transverse to said axis effective to drive said film into the hard or transverse direction, and e. sensing means operably associated with said film and orthogonally disposed relative to said energizing means for operative association with an applied external magnetic field effective to cause said film to switch to one of said stable states, thereby indicating the presence of said external field.

6. An electromagnetic transducer comprising:

a. a rigid supporting structure, b. a magnetizable film disposed on said supporting structure, c. said film having uniaxial anisotropy resulting in a single easy axis of magnetization in the plane of the film and being capable of assuming either of two stable states of magnetic remanence along said axis, d. energizing means operably associated with said film for generating a magnetic field transverse to said axis effective to drive said film into the hard or transverse direction, and e. sensing means operably associated with said film and orthogonally disposed relative to said energizing means for operative association with an applied external magnetic field for causing said film to switch to one of said stable states thereby indicating the presence of said external fields.

7. An electromagnetic transducer comprising:

a. a rigid smooth supporting structure, b. a magnetizable film disposed on said supporting structure, c. said film having uniaxial anisotropy resulting in a single easy axis of magnetization in the plane of the film and being capable of assuming either of two stable states of magnetic remanence along said axis, d. energizing means operably associated with said film for generating a magnetic field transverse to said axis effective to drive said film into the hard or transverse direction, and e. sensing means operably associated with said film and orthogonally disposed relative to said energizing means and to said easy axis of magnetization for operative association with an external magnetic field effective to cause said film to switch to one of said stable states thereby indicating the presence of said external field.

8. An electromagnetic transducer comprising:

a. a rigid smooth supporting structure, b. a plurality of magnetizable films disposed on said supporting structure, c. said films each having uniaxial anisotropy resulting in a single easy axis of magnetization in the plane of the films and being capable of assuming either of two stable states of magnetic remanence along said axis, d. energizing means operably associated with said films for generating a magnetic field transverse to said axis effective to drive said films into the hard or transverse direction, and e. sensing means operably associated with said films and orthogonally disposed relative to said energizing means for operative association with an applied external magnetic field for causing one or more of said films to switch to one of said stable states thereby indicating the presence of said external field.

9. In combination with a movable record member having a magnetizable surface, a transducer comprising:

a plane anisotropic thin magnetic film element having an easy axis of remanent flux orientation defining opposite stable states, said film having at least one edge in close proximity to the surface of said record member with the easy axis being angularly displaced from said one head, and a control winding and a sense winding coupling said film to enable reading of the record member independently of movement thereof.

10. The combination of claim 9 wherein said film has a single plane and is positioned with the plane of the film perpendicular to the surface of said record member.

11. A magnetic sensing unit for reading a movable magnetically encoded storage member having a plurality of magnetically encoded areas, comprising:

at least one thin magnetic strip adapted to be positioned contiguous to a magnetically encoded area; the plane of the strip being substantially normal to that of the storage member;

drive winding means parallel to the easy axis of orientation of the strip for inducing a change in flux of each said thin magnetic strip independently of said magnetically encoded areas, said change being enhanced or retarded in accordance with the particular magnetic area contiguous to said thin magnetic strip; and sense means normal to said drive associated with said thin magnetic strip in close proximity to said magnetically encoded member for providing a signal proportional to said change in flux;

said magnetic strip being anisotropic and having an easy axis of remanent flux orientation defining opposite stable states, and said drive means being adapted to induce a change in flux orientation of each said thin magnetic strip away from said easy axis, said drive winding means being parallel to said easy axis.

12. A magnetic sensing unit for reading a movable magnetically encoded storage member having a plurality of magnetically encoded areas, comprising:

at least one thin magnetic strip adapted to be angularly positioned contiguous to a magnetically encoded area; the plane of said thin film being normal to that of said storage member drive means parallel to the easy axis of orientation of said strip magnetically coupled to each said thin magnetic strip for inducing a change in flux in said strip independently of relative movement thereof with respect to said member and nondestructively as to said magnetically encoded areas, said change being enhanced or retarded in accordance with the particular magnetic area contiguous to said thin magnetic strip; and sense means perpendicular to said drive means magnetically coupled to said thin magnetic strip in close proximity to said magnetically encoded member and responsive to said change in flux for providing a signal which is determined by the state of said contiguous magnetically encoded area;

said magnetic strip being anisotropic and having an easy axis of remanent flux orientation defining opposite stable states, and said drive means being provided for inducing a change in flux orientation in each said strip.

13. A magnetic sensing unit for reading a movable magnetically encoded storage member having a plurality of magnetically encoded areas, comprising:

at least one planar magnetic strip adapted to be positioned transverse to the direction of movement and in magnetic coupling relationship with one of the magnetically encoded areas of said member; the plane of said strip being normal to that of said storage member;

drive means parallel to the easy axis of orientation of said strip magnetically coupled to each said thin magnetic strip for inducing a change in flux in said strip which is affected by the polarity of said magnetically encoded area independently of relative movement thereof with respect to said magnetically encoded member; and sense winding means disposed substantially perpendicular to said drive means and operably associated with said thin magnetic strip for providing a signal, the polarity of which is indicative of the polarity of the coupled magnetically encoded area;

said magnetic strip being anisotropic in character and having an easy axis of remanent flux orientation defining opposite stable states and said drive means being adapted to induce a change in flux orientation in each said strip.

14. A magnetic reading unit for sensing magnetized members and comprising:

support means, at least one thin magnetic strip having a longitudinal axis and supported on said support means such that said longitudinal axis is substantially normal to a magnetically encoded member to be read;

drive winding means parallel to the easy axis of orientation of said strip for receiving a current waveform to effect a flux change in each said thin magnetic strip independently of said magnetically encoded member; and a sense winding perpendicular to said drive winding means associated with said thin magnetic strip in close proximity to said magnetically encoded member for providing an output waveform in accordance with said flux change;

said magnetic strip being anisotropic in character and having an easy axis of remanent flux orientation defining opposite stable states and said drive means being adapted to effect a change in flux orientation in each said strip away from the easy axis, said easy axis being oriented parallel to the direction of magnetization of said magnetized members.

15. A magnetic reading unit for sensing magnetized members and comprising:

support means;

at least one thin magnetic strip supported on said support means substantially normal to an area of a magnetically encoded member to be read;

drive winding means parallel to the easy axis of orientation of said strip for receiving a current waveform of a magnitude to effect a flux change in said thin magnetic strip independently of said magnetically encoded member and nondestructive as to the magnetically encoded area; and sense winding means disposed normal to said drive winding means and magnetically coupled with said thin magnetic strip and responsive to flux change in said strip for providing an output wave form, the polarity of which is indicative of the polarity of said magnetically encoded area;

said magnetic strip being anisotropic in character and having an easy axis of remanent flux orientation defining opposite stable states and said drive means being adapted to effect a change in flux orientation in said magnetic strip with respect to the easy axis thereof, said easy axis being oriented parallel to the direction of magnetization of said magnetized members.

16. A magnetic reading head for sensing magnetized members comprising:

a thin magnetic strip adapted to be angularly positioned with an edge adjacent a surface of a member to be sensed; the plane of the strip being normal to that of the member being sensed;

drive winding means parallel to the easy axis of magnetization of said strip magnetically coupled to said thin magnetic strip near said edge thereof for inducing a change in flux in the portion of said strip near said edge, which is affected by and nondestructive of the magnetization state of said member independently of relative movement therebetween; and sense means disposed perpendicular to said drive winding means and magnetically coupled to said thin magnetic strip in close proximity to said edge of said strip for providing a signal waveform which is determined by the state of said magnetized member;

said magnetic strip being anisotropic in character and having an easy axis of remanent flux orientation defining opposite stable states and said drive means being adapted for inducing a change in flux orientation in the strip, said easy axis of magnetization being oriented parallel to the direction of magnetization of said magnetized members.

17. A magnetic reading head for sensing magnetized members comprising:

a thin magnetic strip adapted to be positioned with an edge adjacent a surface of a member to be sensed; with the plane of the strip normal to that of the member to be sensed;

drive winding means parallel to the easy axis of orientation magnetically coupled to said thin magnetic strip for inducing a change in flux in said strip, which is affected by the magnetization state of said member independently of relative movement therebetween; and sense means disposed perpendicular to said drive means and coupled with said thin magnetic strip proximate said magnetized member for providing a signal waveform which is determined by flux change in the portion of said strip proximate said edge thereof;

said magnetic strip being anisotropic and having an easy axis of remanent flux orientation defining opposite stable states and said drive means being adapted to induce a change in flux orientation with respect to the easy axis of said strip, said easy axis being oriented parallel to the direction of magnetization of said magnetized members.

18. A magnetic sensing unit for monitoring external magnetic fields comprising:

a thin magnetic strip adapted to be positioned at a location to be monitored; the plane of the strip being normal to that of the location to be monitored;

drive winding means parallel to the easy axis of orientation of said strip for inducing a change in flux in said thin magnetic strip independently of relative movement of said strip in the field to be monitored, said change being affected by the external magnetic field present at said location; and sense means perpendicular to said drive means magnetically coupled to said thin magnetic strip for providing an output signal indicative of the presence of an external magnetic field at said location;

said magnetic strip being anisotropic in character and having an easy axis of remanent flux orientation defining opposite stable states and said drive means being adapted to induce a change in flux orientation in said strip with respect to the easy axis thereof, said easy axis being oriented parallel to the direction of said external magnetic fields.

19. A magnetic sensing unit for monitoring external magnetic fields comprising:

a thin magnetic strip adapted to be positioned at a location to be monitored; the plane of the strip being normal to that of the location being monitored;

drive winding means parallel to the easy axis of orientation of said strip for inducing a change in flux in said thin magnetic strip independently of relative movement of said strip in the field to be monitored, said change being enhanced or retarded in accordance with the external magnetic field at said location; and sense winding means perpendicular to said drive means and associated with said thin magnetic strip for providing an output waveform, the polarity of which is indicative of the external magnetic field at said location;

said magnetic strip being anisotropic and having an easy axis of remanent flux orientation defining opposite stable states, and said drive means being adapted to induce a change in flux orientation in said strip away from the easy axis thereof, said easy axis being oriented parallel to said external magnetic fields.

* * * * *